(12) United States Patent
Hathaway

(10) Patent No.: US 8,046,190 B2
(45) Date of Patent: Oct. 25, 2011

(54) AUTOMATED HYPOTHESIS TESTING

(75) Inventor: William M. Hathaway, Powell, OH (US)

(73) Assignee: Moresteam.com LLC, Lewis Center, OH (US)

( * ) Notice: Subject to any disclaimer, the term of this patent is extended or adjusted under 35 U.S.C. 154(b) by 22 days.

(21) Appl. No.: 12/785,223

(22) Filed: May 21, 2010

(65) Prior Publication Data
US 2010/0292958 A1    Nov. 18, 2010

Related U.S. Application Data

(63) Continuation of application No. 11/401,555, filed on Apr. 11, 2006, now Pat. No. 7,725,291.

(51) Int. Cl.
*G06F 19/00*    (2006.01)
(52) U.S. Cl. ...................................................... 702/179
(58) Field of Classification Search .................. 702/179, 702/182–185
See application file for complete search history.

(56) References Cited

U.S. PATENT DOCUMENTS

| | | |
|---|---|---|
| 6,377,868 B1 | 4/2002 | Gardner, Jr. |
| 7,095,979 B2 | 8/2006 | Stout |
| 2003/0033127 A1 | 2/2003 | Lett |
| 2004/0153430 A1 | 8/2004 | Sayad |
| 2004/0236776 A1 | 11/2004 | Peace |
| 2005/0022168 A1* | 1/2005 | Zhu et al. ................ 717/124 |
| 2006/0058606 A1 | 3/2006 | Davis et al. |

* cited by examiner

*Primary Examiner* — Edward Raymond
(74) *Attorney, Agent, or Firm* — Michael Best & Friedrich LLP

(57) ABSTRACT

A method of automatically applying a hypothesis test to a data set. The method reduces errors made in failing to appreciate predicate assumptions of various statistical tests, and elicits a series of indications from the user regarding characteristics of interest embodied by the data set to select an appropriate statistical test. The system also reduces errors in constructing competing null and alternative hypothesis statements by generating a characterization of the data and defining null and alternative hypotheses according to the indications, selected statistical test, and conventions adopted with respect to the tests. The system also establishes a significance level, calculates the test statistic, and generates an output. The output of the system provides a plain interpretation of the quantitative results in the terms indicated by the user to reduce errors in interpretation of the conclusion.

45 Claims, 15 Drawing Sheets

MORESTEAM.COM HYPOTHESIS TESTING WIZARD

WELCOME TO THE MORESTEAM.COM HYPOTHESIS TESTING WIZARD!
HYPOTHESIS TESTING IN PLAIN ENGLISH

HYPOTHESIS TESTS MAY BE USED TO COMPARE TWO OR MORE TREATMENTS OR METHODS TO EACH OTHER OR TO COMPARE ONE TREATMENT OR METHOD TO A STANDARD. THIS WIZARD WILL WALK YOU THROUGH THE PROCESS OF CONDUCTING A TEST OF HYPOTHESIS USING PLAIN ENGLISH.

IF YOU ARE ALREADY FAMILIAR WITH THE HYPOTHESIS TESTING PROCESS, YOU MAY BYPASS THE WIZARD DIALOGUE AND CONDUCT THE TEST DIRECTLY USING THE LIST OF GUIDE MAPS THAT WILL APPEAR ONCE YOU ANSWER THE QUESTION BELOW.

THE OVER-RIDING ASSUMPTION OF ALL HYPOTHESIS TESTS IS THAT THE DATA ARE RANDOMLY SAMPLED FROM THE WHOLE PROCESS/POPULATION, TO ENSURE A REPRESENTATIVE PICTURE.

— SELECT WIZARD MODE —
○ QUESTION & ANSWER
○ LIST OF TESTS (PARAMETRIC AND NON PARAMETRIC)
○ GUIDE MAP (PARAMETRIC)
○ GUIDE MAP (NON-PARAMETRIC)

TIME ORDERED DATA

IF YOU ARE NOT USING SUMMARY STATISTICS, IT IS RECOMMENDED THAT YOU PLOT YOUR TIME ORDERED DATA BEFORE CONTINUING.

HAVE YOU PLOTTED YOUR DATA ON A CONTROL CHART AND VERIFIED THAT THE PROCESS IS STABLE? IF THE PROCESS IS NOT STABLE, THE HYPOTHESIS TEST RESULTS WILL NOT BE MEANINGFUL.

[ YES ]  [ NO ]

[ EXIT ]  [ HELP ]  [ RESET ]        [ <<BACK ]  [ NEXT>> ]  [ FINISH ]

*FIG. 3*

*MORESTEAM.COM HYPOTHESIS TESTING WIZARD*

STEP 1 OF 6 - DETERMINE THE TEST

STEP A  IF YOUR DATA ARE BASED ON COUNTING THINGS, FOR EXAMPLE, THE NUMBER OF DEFECTIVES IN A SAMPLE, OR THE NUMBER OF DEFECTS ON A UNIT, OR IF THEY'RE IN THE FORM OF A RANK ORDER (E.G. GOOD/BETTER/BEST), YOU HAVE ATTRIBUTE DATA. CLICK HELP FOR MORE.

IF YOUR DATA ARE MEASURED, E.G. LENGTH OF A PIECE OF WIRE, WEIGHT OF AN OBJECT OR THE AMOUNT OF TIME SPENT WAITING IN LINE, YOU HAVE VARIABLE DATA. KEEP IN MIND, HOWEVER, THAT IN CERTAIN CASES COUNTS MAY BE TREATED AS VARIABLE DATA. CLICK HELP FOR MORE.

STEP B  HOW MANY SAMPLES DOES YOUR DATA SET CONSIST OF?

STEP C  DO YOUR DATA COME FROM A POPULATION/PROCESS THAT IS DISTRIBUTED NORMALLY? (CLICKING 'DON'T KNOW' WILL TAKE YOU TO THE NORMALITY TEST)

SELECT DATA TYPE
● ATTRIBUTE DATA  ○ VARIABLE DATA

NUMBER OF SAMPLES
○ 1  ● 2  ○ 3 OR MORE

DATA DISTRIBUTION NORMAL?
○ YES  ● NO  ○ DON'T KNOW

NON-NORMAL DATA

IF YOUR DATA ARE NOT NORMALLY DISTRIBUTED, YOU HAVE TWO OPTIONS.
1) YOU CAN TRANSFORM YOUR DATA AND PROCEED WITH A PARAMETRIC TEST.
2) YOU CAN USE A NON-PARAMETRIC TEST.

CLICK 'YES' TO USE A NON-PARAMETRIC TEST.
CLICK 'NO' TO EXIT THE WIZARD AND OPEN THE ENGINE ROOM NORMALITY TEST TEMPLATE.
CLICK 'CANCEL' TO EXIT THE WIZARD.

[YES]  [NO]  [CANCEL]

[EXIT]  [HELP]  [RESET]            [<<BACK]  [NEXT>>]  [FINISH]

FIG. 7

MORESTEAM.COM HYPOTHESIS TESTING WIZARD

STEP 1 OF 6 - DETERMINE THE TEST

STEP A  IF YOUR DATA ARE BASED ON COUNTING THINGS, FOR EXAMPLE, THE NUMBER OF DEFECTIVES IN A SAMPLE, OR THE NUMBER OF DEFECTS ON A UNIT, OR IF THEY'RE IN THE FORM OF A RANK ORDER (E.G. GOOD/BETTER/BEST), YOU HAVE ATTRIBUTE DATA. CLICK HELP FOR MORE.

IF YOUR DATA ARE MEASURED. E.G. LENGTH OF A PIECE OF WIRE, WEIGHT OF AN OBJECT OR THE AMOUNT OF TIME SPENT WAITING IN LINE, YOU HAVE VARIABLE DATA. KEEP IN MIND, HOWEVER, THAT IN CERTAIN CASES COUNTS MAY BE TREATED AS VARIABLE DATA. CLICK HELP FOR MORE.

STEP B  HOW MANY SAMPLES DOES YOUR DATA SET CONSIST OF?

STEP C  DO YOUR DATA COME FROM A POPULATION/PROCESS THAT IS DISTRIBUTED NORMALLY? (CLICKING 'DON'T KNOW' WILL TAKE YOU TO THE NORMALITY TEST)

STEP D  DO YOU WANT TO COMPARE THE MEAN (AVERAGE) OR VARIANCE (DISPERSION) OF YOUR POPULATIONS?

STEP E  ARE YOUR 2 SAMPLES PAIRED (OR RELATED ON SOME CHARACTERISTIC)? CLICK <HERE> FOR MORE INFORMATION ON PAIRED SAMPLES.

SELECT DATA TYPE
⦿ ATTRIBUTE DATA  ○ VARIABLE DATA

NUMBER OF SAMPLES
○ 1  ⦿ 2  ○ 3 OR MORE

DATA DISTRIBUTION NORMAL?
○ YES  ⦿ NO  ○ DON'T KNOW

SELECT PARAMETER
⦿ MEAN  ○ VARIANCE

PAIRED DATA?
⦿ YES  ○ NO

THE RECOMMENDED TEST IS THE ONE MEAN t-TEST (PAIRED SAMPLES).

[EXIT] [HELP] [RESET]  [<<BACK] [NEXT>>] [FINISH]

*FIG. 8*

MORESTEAM.COM HYPOTHESIS TESTING WIZARD

STEP 2 OF 6 - IDENTIFY THE DATA    POPULATION(S) MAY BE CONSIDERED ALTERNATELY AS TREATMENT(S) OR METHOD(S). LET'S LOOK AT WHAT WE HAVE SO FAR. YOU ARE USING VARIABLE DATA. YOU HAVE SELECTED THE ONE MEAN t-TEST (PAIRED SAMPLES) AND ARE TESTING A STATEMENT ABOUT THE MEANS OF THE POPULATION OF DIFFERENCES (Pop1-Pop2).

WHAT IS THE DIFFERENCE OF INTEREST (muD) FOR THE MEANS OF YOUR POPULATIONS? CLICK <HERE> FOR A DEFINITION OF 'DIFFERENCE OF INTEREST'.    0.03

ENTER THE NAME(S) OF EACH OF THE   1. APPLES
POPULATION(S):                     2. ORANGES

PROVIDE NAMES FOR THE POPULATIONS THAT ARE MEANINGFUL IN THE CONTEXT OF THE STUDY. FOR TESTS OF A SINGLE POPULATION, THIS COULD SIMPLY BE THE VARIABLE MEASURED, FOR E.G., 'SCORES' OR 'YIELDS'.

WHEN COMPARING TWO OR MORE POPULATIONS, HOWEVER, YOU MAY PROVIDE NAMES BASED ON THE POPULATIONS BEING COMPARED, SUCH AS 'CONTROL' AND 'TREATMENT', 'BEFORE' AND 'AFTER', 'HOSPITAL 1', 'HOSPITAL 2' AND 'HOSPITAL 3', ETC.

WILL YOU BE USING SUMMARY STATISTICS FOR YOU DATA OR DO YOU WANT TO USE RAW DATA FROM A DATA SHEET?

SUMMARY STATISTICS OR DATA SHEET?
○ SUMMARY STATISTICS  ● DATA SHEET

EXIT   HELP   RESET        <<BACK   NEXT>>   FINISH

FIG. 9

*MORESTEAM.COM HYPOTHESIS TESTING WIZARD*

STEP 5 OF 6 - DATA ENTRY

TEST: *TWO PROPORTIONS Z-TEST*

| VARIABLE NAME | DATA SHEET |
|---|---|
| 1. APPLES | APPLES ▸ |
| 2. ORANGES | ORANGES ▸ |

NULL HYPOTHESIS: *THE POPULATION PROPORTION OF APPLES MINUS THE POPULATION PROPORTION OF ORANGES IS EQUAL TO 0.03.*

ALTERNATIVE HYPOTHESIS: *THE POPULATION PROPORTION OF APPLES MINUS THE POPULATION PROPORTION OF ORANGES IS NOT EQUAL TO 0.03.*

[EXIT] [HELP] [RESET] [<<BACK] [NEXT>>] [FINISH]

FIG. 12

AUTOMATED HYPOTHESIS TESTING

RELATED APPLICATION

This application is a continuation of U.S. Ser. No. 11/401,555, now U.S. Pat. No. 7,725,291, filed on Apr. 11, 2006, the entire contents of which are hereby incorporated by reference.

FIELD OF THE INVENTION

The invention relates to methods and systems for using statistical analysis tools, and more particularly to methods and systems for automatically constructing and interpreting hypothesis tests.

BACKGROUND

Statistical tests provide a mechanism for making quantitative conclusions about characteristics or behavior of a process as represented by a sample of data drawn from the process. Statistical tests also are used to compare characteristics or behaviors of two or more processes based on respective data sets or samples drawn from the processes.

The term "hypothesis testing" describes a broad topic within the field of statistical analysis. Hypothesis testing entails particular methodologies using statistical tests to calculate the likely validity of a claim made about a population under study based on observed data. The claim, or theory, to which the statistical testing is applied is called a "hypothesis" or "hypothesis statement", and the data set or sample under study usually represents a sampling of data reflecting an input to, or output of, a process. A well-constructed hypothesis statement specifies a certain characteristic or parameter of the process. Typical process characteristics used in hypothesis testing include statistically meaningful parameters such as the average or mean output of a process (sometimes also referred to as the "location" of the process) and/or the dispersion/spread or variance of the process.

When constructing a hypothesis test, a hypothesis statement is defined to describe a process condition of interest that, for the purpose of the test, is alleged to be true. This initial statement is referred to as the "null hypothesis" and is often denoted algebraically by the symbol $H_0$. Typically the null hypothesis is a logical statement describing the putative condition of a process in terms of a statistically meaningful parameter. For example, consider an example of hypothesis testing as applied to the discharge/output of a wastewater treatment process. Assume there are concerns that the process recently has changed such that the output is averaging a higher level of contaminants than the historical (and acceptable) output of 5 parts of contaminant per million (ppm). A null hypothesis based on this data could be stated as follows: the level of contaminants in the output of the process has a mean value equal to or greater than 5 ppm. The null hypothesis is stated in terms of a meaningful statistical parameter, i.e., process mean, and in terms of the process of interest, i.e., the level of contaminants in the process output.

Likewise, hypothesis testing also entails constructing an alternative hypothesis statement regarding the process behavior or condition. For the purpose of the test, the status of the alternative hypothesis statement is presumed to be uncertain, and is denoted by the symbol $H_1$. An alternative hypothesis statement defines an uncertain condition or result in terms of the same statistical parameter as the null hypothesis, e.g., process mean, in the case of the wastewater treatment example. In that example, an alternative hypothesis statement would be defined along the following lines: the level of contaminants in the output of the process has a mean value of less than 5 ppm. In constructing null and alternative hypotheses, it is imperative that the statements be stated in terms that are mutually exclusive and exhaustive, i.e., such that there is neither overlap in possible results nor an unaccounted for or "lurking" hypothesis.

One object in applying hypothesis testing is to see if there is sufficient statistical evidence (data) to reject a presumed null hypothesis $H_0$ in favor of an alternative hypothesis $H_1$. Such a rejection would be appropriate under circumstances wherein the null hypothesis statement is inconsistent with the characteristics of the sampled data. In the alternative, in the event the data are not inconsistent with the statement made by the null hypothesis, then the test result is a failure to reject the null hypothesis—meaning the data sampling and testing does not provide a reason to believe any statement other than the null hypothesis. In short, application of a hypothesis test results in a statistical decision based on sampled data, and results either in a rejection of the null hypothesis $H_0$, which leaves a conclusion in favor of the alternative $H_1$, or a failure to reject the null hypothesis $H_0$, which leaves a conclusion wherein the null hypothesis cannot be found false based on the sampled data.

Any Hypothesis Test can be conducted by following the four steps outlined below:

Step 1—State the null and alternative hypotheses. This step entails generating a hypothesis of interest that can be tested against an alternative hypothesis. The competing statements must be mutually exclusive and exhaustive.

Step 2—State the decision criteria. This step entails articulating the factors upon which a decision to reject or fail to reject the null hypothesis will be based. Establishing appropriate decision criteria depends on the nature of the null and alternative hypotheses and the underlying data. Typical decision criteria include a choice of a test statistic and significance level (denoted algebraically as "alpha" $\alpha$) to be applied to the analysis. Many different test statistics can be used in hypothesis testing, including use of a standard or test value associated with the process data, e.g., the process mean or variance, and/or test values associated with the differences between two processes, e.g., differences between proportions/means/medians, ratios of variances and the like. The significance level reflects the degree of confidence desired when drawing conclusions based on the comparison of the test statistic to the reference statistic.

Step 3—Collect data relating to the null hypothesis and calculate the test statistic. At this step, data is collected through sampling and the relevant test statistic is calculated using the sampled data.

Step 4—State a conclusion. At this step, the appropriate test statistic is compared to its corresponding reference statistic (based on the null distribution) which shows how the test statistic would be distributed if the null hypothesis were true. Generally speaking, a conclusion can be properly drawn from the resultant value of the test statistic in one of several different ways: by comparing the test statistic to the predetermined cut-off values, which were established in Step 2; by calculating the so-called "p-value" and comparing it to the predetermine significance level $\alpha$ alpha; or by computing confidence intervals. The p-value is quantitative assessment of the probability of observing a value of the test statistic that is either as extreme as or more extreme than the calculated value of the test statistic, purely by random chance, under the assumption that the null hypothesis is true.

SUMMARY

There are several different forms of statistical tests that are useful in hypothesis testing. Those of skill in the art will understand how tests such as t-tests, Z-tests and F-tests can be used for hypothesis testing by way of the above methodology, but each may be appropriate only if a variety of predicates are found. In particular, the applicability of a particular test depends on, among other things, the nature of the hypothesis statements, the nature of the data available, and assumptions relating to the distributions and sampling of the data. For example, sometimes the hypotheses under consideration entail a comparison of statistical means, a comparison of variances, or a comparison of proportions. Similarly, the data may be either attribute data or variable/continuous data. With respect to assumptions of the distributions and sampling of data, different statistical tests are appropriate depending upon, for example, whether the sample sizes are large or small, time ordered or not, paired samples or not, or whether variances of the samples are know or not. The selection of an appropriate test for a particular set of predicates is imperative because application of an inappropriate test can result in unfounded or erroneous conclusions, which in turn lead to faulty decisions.

The proper construction of the null and alternative hypotheses also requires an understanding of the statistical test and its underlying assumptions. In addition, it is imperative that the null and alternative hypotheses be constructed so as to be mutually exclusive and exhaustive. Moreover, it is sometimes difficult for the practitioner to construct a meaningful set of competing null and hypothesis statements in terms of the process and data of interest.

Interpreting the conclusions of a hypothesis test can also be difficult, even when the appropriate test is selected, an appropriate null hypothesis is subjected to the test statistic, and the test statistic is accurately calculated. This difficulty in interpretation can arise if the results of the test are not expressed in terms that relate the quantitative analysis to the terms used in describing the process, or if the basis for the conclusion is not clear. Indeed, in some cases, the construction of a null hypothesis and the associated data analysis results in an appropriate (but counterintuitive) conclusion that the null should not be rejected due to the absence of a data-supported basis that the null hypothesis is false. The logic underlying the conclusion is sound, but often misunderstood.

Hypothesis testing thus has the potential to bring powerful tools to bear on the understanding of complex process behaviors, particularly processes that behave in a manner that is not intuitive. Hypothesis testing brings the power and focus of data-driven analysis to decision making, which sometimes can be lead astray by the complexities of the process of interest or biases of the decision maker. However, despite the power and usefulness of hypothesis testing, it remains a difficult tool to apply. One of the difficulties often encountered in applying hypothesis tests is the fact that each statistical test depends on multiple predicates or assumptions for validity. Applying a test statistic to a data set that does not embody the predicate assumptions can result in conclusions that are unsupported by the data, yet are not obviously so. Consequently, it is possible to make unfounded decisions in error.

Another problem with the application of hypothesis testing is the somewhat counter-intuitive requirement that the null hypothesis be stated and then the conclusion be drawn so as to either reject or fail to reject the null hypothesis (rather than merely accepting the null hypothesis). This difficulty is common for a variety of reasons, among them the requirements that the statements be mutually exclusive and exhaustive, the statements be posed in terms of a statistically meaningful parameter that is appropriate in view of the process data to be sampled, and the statements should be stated in terms that will provide meaningful insight to the process, i.e., will be useful in making a decision based on the data.

In this regard, while it is important to state the hypothesis test in terms of the problem, it is equally important (and perhaps more important) to interpret the conclusions of the test in practical terms. Whether the test statistic supports either rejection or failure to reject the null hypothesis, the result needs to be correctly stated and understood in practical terms so that the results of the test can guide decisions pertaining to the process or processes.

Accordingly, the invention provides, in one embodiment, a method of automatically applying hypothesis testing to a data set. The method provides a plurality of statistical tests and, through a series of queries and indications, the method assures that multiple predicates or assumptions for validity of each statistical test are affirmatively considered. By confirming the assumptions and providing confirmatory notifications relating to the implications of the queries and indications, the method assures application of a statistical test to the data appropriate for the predicate assumptions of the test.

In another embodiment, the invention provides a method of automatically applying hypothesis testing to a data set including generating definitions of the null and alternative hypotheses in terms of the a statistical test, its underlying assumptions, so as to be mutually exclusive and exhaustive, and in terms indicated by the user as being descriptive of the processes and data of interest.

In yet another embodiment, the invention provides a method of automatically applying hypothesis testing to a data set including generating test conclusions expressed in terms relating the quantitative analysis to terms indicated as describing the process, and providing the basis for conclusions in terms describing the process.

Other features and advantages of the invention will become apparent to those skilled in the art upon review of the following detailed description, claims, and drawings.

BRIEF DESCRIPTION OF THE DRAWINGS

FIG. 3 illustrates a user interface generated by the software.
FIG. 7 illustrates a user interface generated by the software.
FIG. 8 illustrates a user interface generated by the software.
FIG. 9 illustrates a user interface generated by the software.
FIG. 12 illustrates a user interface generated by the software.

DETAILED DESCRIPTION

Before any aspects of the invention are explained in detail, it is to be understood that the invention is not limited in its application to the details of construction and the arrangement of components set forth in the following description or illustrated in the following drawings. The invention is capable of other embodiments of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. The terms "connected," "coupled," and "mounted" and variations thereof herein are used broadly and, unless otherwise stated, encompass both direct and indirect connections, couplings, and mountings. In addition, the terms connected and coupled and variations thereof herein are not restricted to physical and mechanical connections or couplings. As used herein the term "computer" is not limited to a device with a single processor, but may encompass multiple computers linked in a system, computers with multiple processors, special purpose devices, computers or special purpose devices with various peripherals and input and output devices, software acting as a computer or server, and combinations of the above. In general, computers accept and process information or data according to instructions (i.e., computer instructions).

Figure 1:
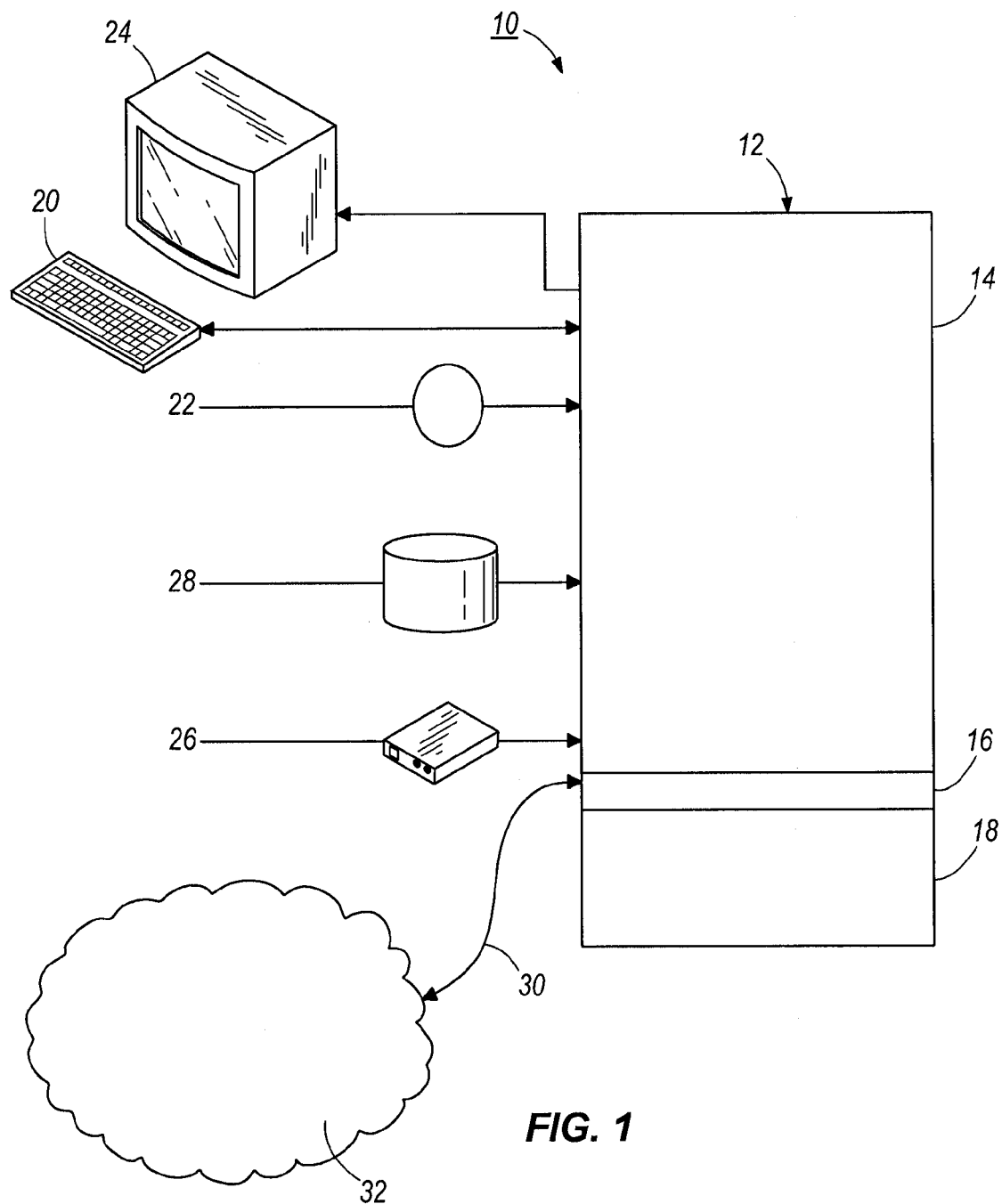
FIG. 1 is a schematic diagram of a computer system for implementing a software program embodying the invention.
Figure 2:
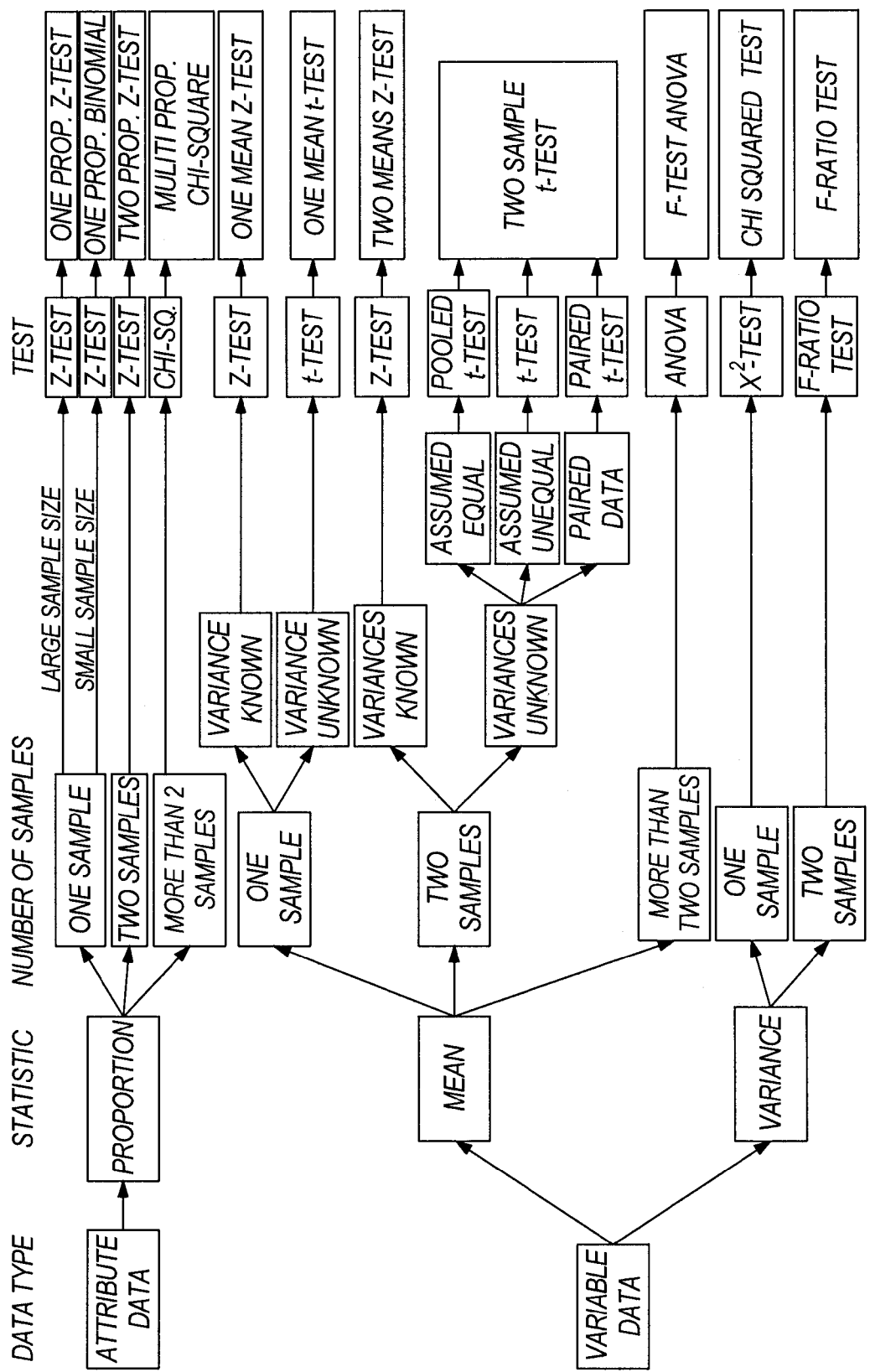
FIG. 2 is a schematic diagram of a logic tree for implementing the hypothesis testing effected by the software program.
Figure 4:
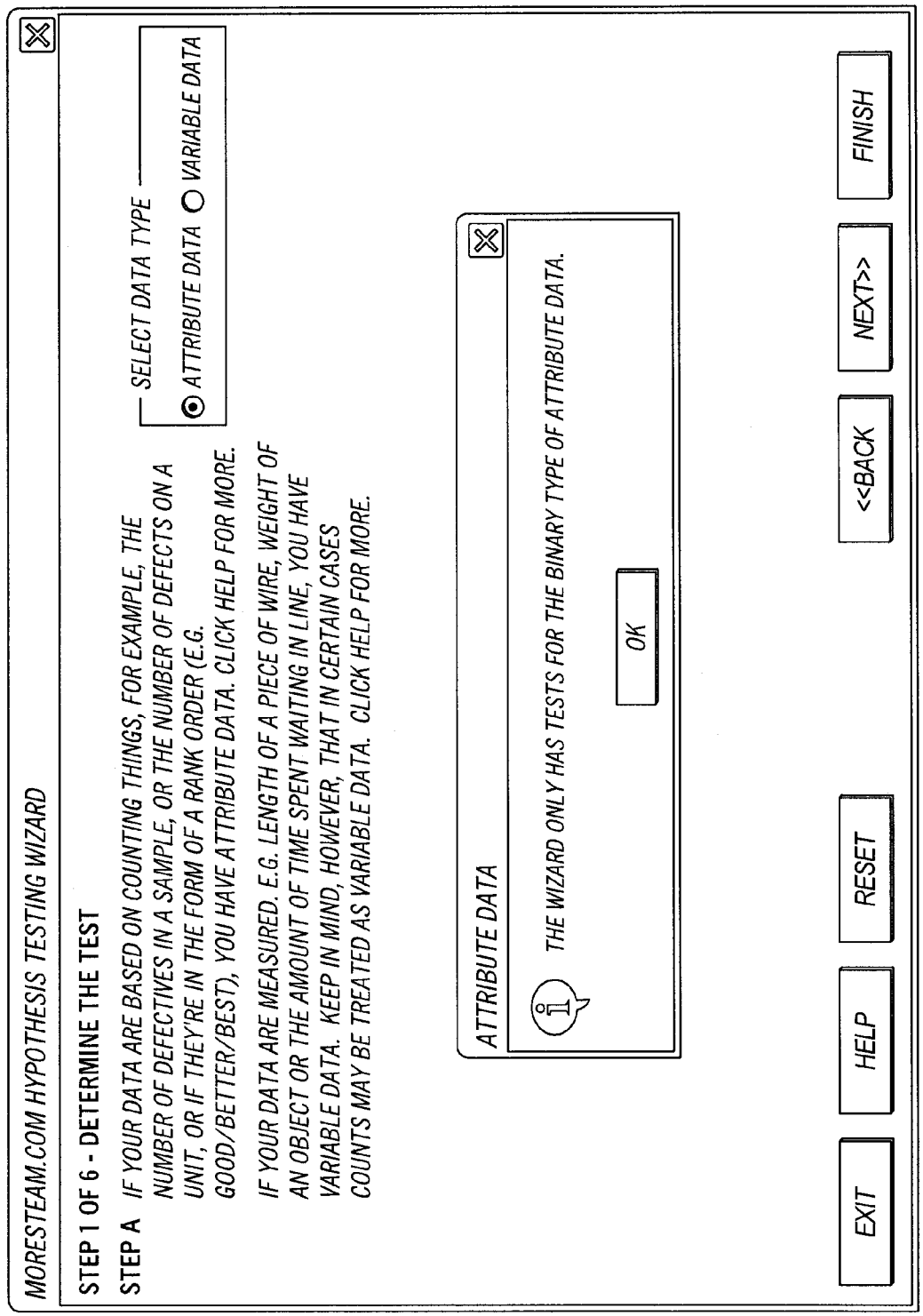
FIG. 4 illustrates a user interface generated by the software.
Figure 5:
FIG. 5 illustrates a user interface generated by the software.
Figure 6:
FIG. 6 illustrates a user interface generated by the software.

The drawings illustrate a system for automatically applying hypothesis testing to one or more data sets having a variety of statistically significant characteristics. Specifically, with reference initially to FIG. 1, the system includes a general purpose computer 10. The computer 10 provides a platform for operating a software program that applies hypothesis testing to one or more data sets. In the system identified, data and program files are input to the computer 10, which reads the files and executes the programs therein. Some of the elements of the computer 10 include a processor 12 having an input/output (IO) section 14, a central processing unit (CPU) 16, and a memory module 18. In one form, the software program for applying hypothesis testing is loaded into memory 18 and/or stored on a configured CD ROM (not shown) or other storage device (not shown). The IO section 14 is connected to keyboard 20 and an optional user input device or mouse 22. The keyboard 20 and mouse 22 enable the user to control the computer 10. IO section 14 is also connected to monitor 24. In operation, computer 10 generates the user interfaces identified in FIGS. 3-14 and displays those user interfaces on monitor 24. The computer also includes CD ROM drive 26 and data storage unit 28 connected to IO section 14. In some embodiments, the software program for effecting hypothesis testing may reside on storage unit 28 or in memory unit 18 rather than being accessed through the CD ROM drive using a CD ROM. Alternatively, CD ROM drive 26 may be replaced or supplemented by a floppy drive unit, a tape drive unit, or other data storage device. The computer 10 also includes a network interface 30 connected to IO section 14. The network interface 30 can be used to connect the computer 10 to a local area network (LAN), wide are network (WAN), internet based portal, or other network 32. Any suitable interface can suffice, including both wired and wireless interfaces. Thus, the software may be accessed and run locally as from CD ROM drive 26, data storage device 28, or memory 18, or may be remotely accessed through network interface 30. In the networked embodiment, the software would be stored remote from the computer 10 on a server or other appropriate hardware platform or storage device.

Figure 14:
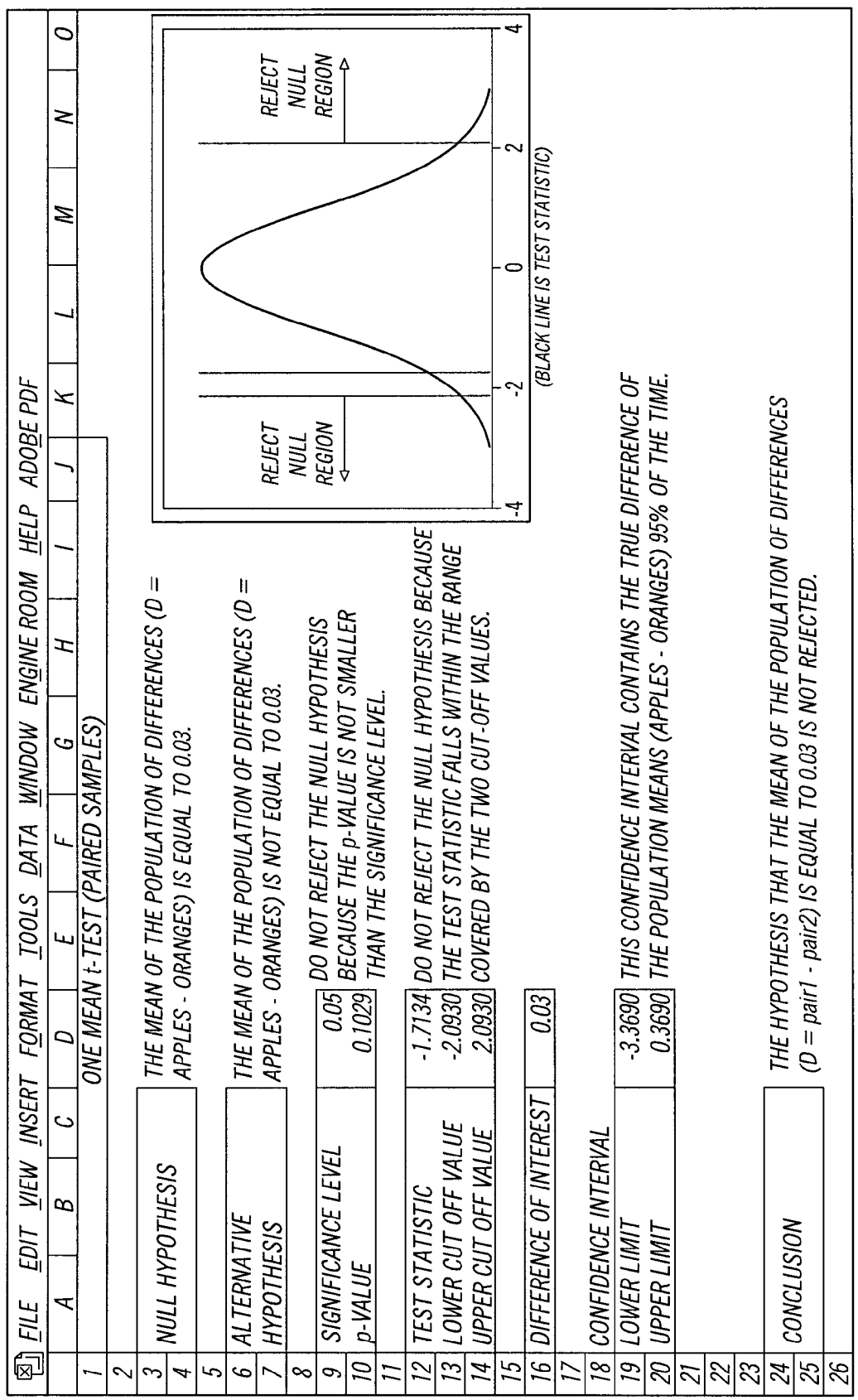
FIG. 14 illustrates a user interface generated by the software.
Figure 15:
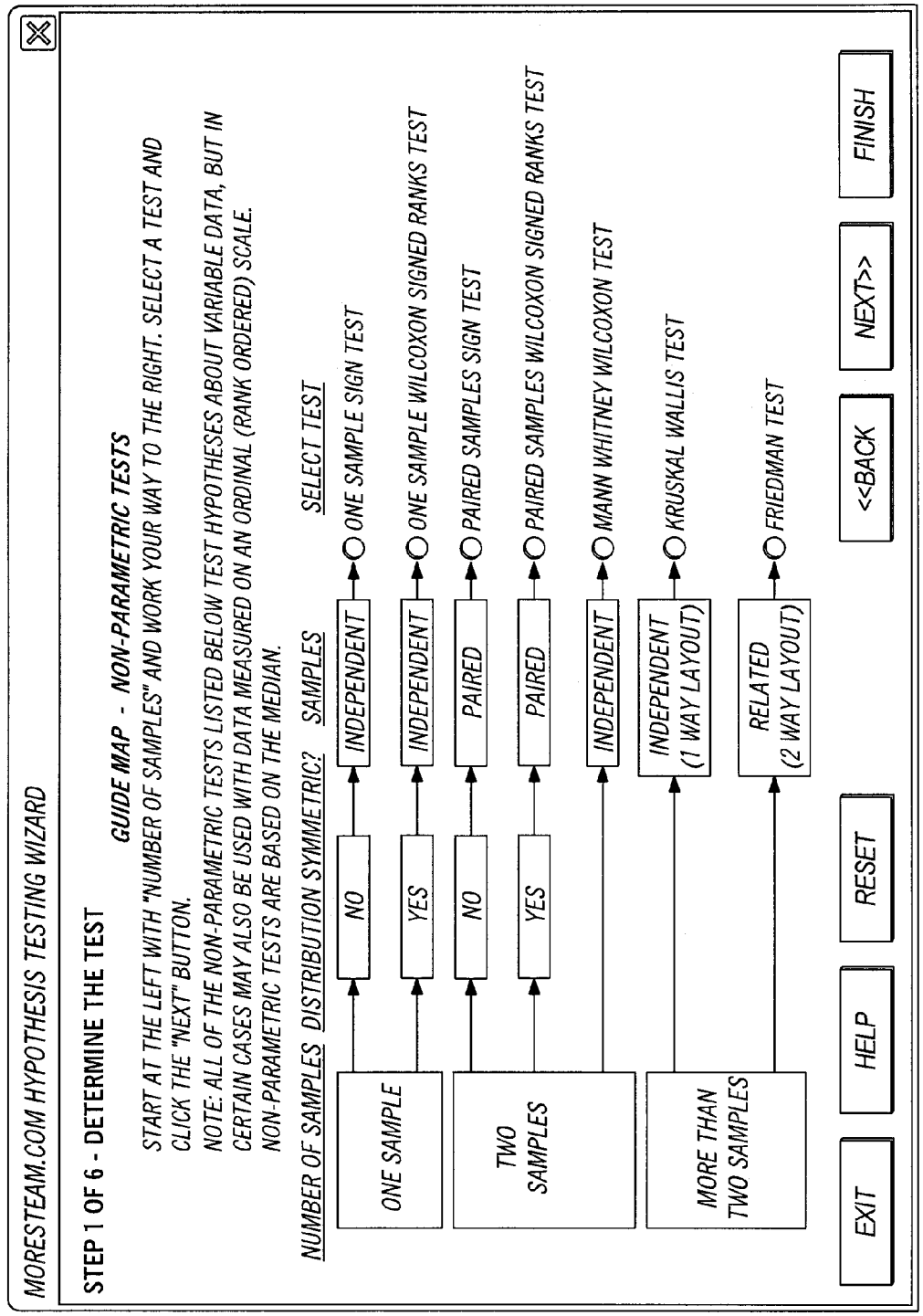
FIG. 15 is similar to FIG. 2 and schematically illustrates a second set of statistical tests that can be performed using the software.

The software program provides algorithms relating to a plurality of statistical tests that can be applied under a variety of circumstances to the data sets. For example, the illustrated system provides the following statistical tests: one proportion Z-test, one proportion binomial test, two proportion Z-test, multi proportion Chi-square test, one mean Z-test, one mean t-test, two means Z-test, two sample t-test; F-test Anova, Chi square test, and an F-ratio test. FIG. 14 illustrates a second set of statistical tests, known as parametric tests: One Sample Sign Test, Paired Samples Sign Test, One Sample Wilcoxon Signed Ranks Test, Paired Samples Wilcoxon Signed Ranks Test, Mann Whitney Wilcoxon Test, Kruskal Wallis Test, and The Friedman Test. The system of course could include other statistical tests useful for hypothesis testing. These statistical tests are useful when applied to data embodying various characteristics. For example, some of the tests are useful when applied to attribute data while others are not. Similarly, some of the tests are useful when applied to data wherein the mean or location of the process from which the data is drawn is known, and others are not. Applying a test to a data set without understanding the assumptions underlying the test can generate erroneous or unfounded results.

The system also establishes conventions associated with each test of the plurality of tests. Among the conventions incorporated in the system is the convention of stating the null hypothesis as an equality for those tests wherein such a logical statement is appropriate. For example, the system avoids stating the null as being "greater than or equal to" a reference value. Another convention adopted by the system is to state the alternative hypothesis statement as an inequality, which logically follows from the convention of defining the null hypothesis.

The system automatically determines the appropriate statistical test. The determination of the appropriate statistical test is made automatically in response to indications or choices made by the user in response to queries or prompts generated by the system. The system design follows a logic map that forces the user to confront and affirm choices regarding the data and information available to the user seeking to apply hypothesis testing to the data. Not only does the system drive the user to application of the correct test, but it also informs the user of the implications of the choices and consequences of making inappropriate indications.

Initially, the system provides this determination process by seeking an indication as to whether the data set the user seeks to asses is time ordered. In response to this indication, the system generates a confirmatory notification explaining the importance in hypothesis testing of process stability. More particularly, assuming the data subjected to the hypothesis testing is randomly drawn from a process of interest, it is imperative that the process be stable. Otherwise, the results drawn from the hypothesis test are not meaningful.

The test determining step also includes seeking an indication of the nature of data as being attribute data or continuous data, again because some of the statistical tests are useful with attribute data and some are not. In the illustrated system, if the indication is that the data are attribute data, then the system further seeks an indication as to the number of samples from which the data is drawn, an indication of sample size, and seeks an indication of normality of the data. Likewise, in response to an indication that the data are continuous, the system then seeks an indication as to the number of samples from which the data are drawn, an indication of sample size and seeks an indication as to whether the data are normal, not normal, or if normalcy is unknown.

The system, in determining the test, responds to the indications of normality. If the indication is that the data are either not normal or the normality of the data is unknown, then the system provides a confirmatory notification either to use a normality test to determine normality, to use non-parametric tests or to use data transformation functions.

Determining the test also includes identifying a statistical parameter of interest. Identifying a statistical parameter of interest includes selecting a parameter of interest from among the following commons statistical parameters: proportion, mean, median, and variance of the data.

Determining the test also includes seeking an indication of whether, depending on the number of samples indicated, the data sample includes either paired data or differences between paired data samples. Likewise, if the parameter of interest is indicated as being the mean, then the system also seeks an indication of whether variance of population is known.

Ultimately, the system automatically selects the appropriate statistical test from among the plurality of tests based on the indications and established conventions, and further provides a confirmatory notification of the nature of the selected test, the indications and established conventions.

The system also automatically characterizes the data set by establishing test criteria, selecting an appropriate reference test value depending on the test selected; and eliciting an indication of a description of the data of interest. Specifically, the system prompts the user to identify values for the statistic of interest, e.g., proportion, variance or mean. The system confirms the value and will prompt the user if inappropriate values are indicated. For example, the system will advise the user that the value of a population proportion must lie between zero and one. Likewise, the system prompts the user to provide descriptions of the data, e.g., names for the methods or treatments subjected to the hypothesis test. As described below, these indications, provided in the user's own language or terms, are used in confirmatory notifications, construction of the null and alternative hypotheses, and in explaining and interpreting conclusions drawn from the hypothesis test.

The system also automatically constructs the null and alternative hypothesis statements based in large part on the test selected, the data characterizations as indicated by the user, and according to the various conventions associated with the tests and data. Defining the null hypothesis includes generating a confirmation of the indications made by the user and the implications of the chosen fields. The system also provides a confirmatory notification of the null hypothesis statement. In one embodiment, the null hypothesis statement is made in terms of an equality. The system likewise automatically constructs the alternative hypothesis statement based on the selected test and assumed conventions relating to the selected test and indications of the test criteria and population description. The system provides a confirmatory notification of the alternative hypothesis statement and the implications of the choices made by the user.

The system also seeks an indication of the desired significance level to be applied to the hypothesis test, and describes the implications of the choice of significance level in hypothesis testing. The system then automatically conducts the selected test and generates an output. Preferably, the output is in graphical and numeric form, and includes text using the terms provided by the user in describing the data.

In this regard, the system generates an output including calculations of the values of the test statistic, calculating cut-off values, confidence intervals, and calculating p-values; comparing the calculated p-value to the indicated significance level, comparing the value of the test statistic to one or more of the reference values, the cut-off values or confidence intervals in view of the null hypothesis statement. The system formulates and expresses the conclusion in terms of the selected test, the indicated test criteria and population descriptions, in terms indicated by the user, as to whether to reject the null hypothesis or not to reject the null hypothesis, and also states the basis for the conclusion. By using the terms supplied by the user and explaining the conclusion using both the indicated terms and the automatically calculated values of the test statistic, the system provides a tool for using hypothesis testing that reduces the likelihood or errors occurring though misunderstanding predicate assumptions of the tests, flawed null/alternative hypothesis statements and misinterpretation of the test results.

The system is preferably in the form of computer-readable modules capable of providing the functionalities of the system. Those of skill in the art will also readily recognize that the description and disclosure of the system herein also describes and discloses a method for automatically applying hypothesis testing to a data set. While there are many possible embodiments of the software program, one commercially available embodiment is the Engine Room® data analysis software provided by Moresteam.com., and which can be purchased online at www.moresteam.com/engineroom.

Various other features and advantages of the invention are set forth in the following claims.

What is claimed is:

1. A method of automatically applying hypothesis testing to at least one data set, the method comprising using a computer to carry out the steps of:
   A. selecting a plurality of statistical tests applicable to the at least one data set, the tests having a variety of characteristics
   B. establishing conventions associated with each test of the plurality of tests;
   C. determining the test including seeking indications as to at least one characteristic of the data set, generating at least one confirmatory notification in response to the indications, and selecting a test from among the plurality of tests based on the indications and established conventions, and providing a confirmatory notification of the nature of the selected test, the indications and established conventions;
   D. characterizing the data set, including establishing test criteria, selecting an appropriate reference test value depending on the test selected; and eliciting an indication of a description of the data of interest;
   E. constructing null and alternative hypothesis statements;
   F. selecting a significance level,
   G. conducting the selected test including calculating the values of the test statistic, reference values, confidence bounds and p-values, comparing the calculated p-value to the indicated significance level and the value of the test statistic to one or more reference values, and assessing the confidence bounds in view of the null hypothesis statement;
   H. stating a conclusion in terms of the selected test, indicated test criteria and data descriptions whether to reject the null hypothesis or not to reject the null hypothesis and stating the basis for the conclusion using the results of the conducting step.

2. The method set forth in claim 1 including establishing the convention of stating the null and alternative hypotheses in mathematical terms.

3. The method set for in claim 2 where the convention states the null hypothesis statement as an equality and the alternative hypothesis statement as an inequality.

4. The method set forth in claim 1 wherein the plurality of tests including at least one of one proportion Z-test, one proportion binomial test, two proportion Z-test, multi proportion Chi-square test, one mean Z-test, one mean t-test, two means Z-test, two sample t-test; F-test Anova, Chi square test, and F-ratio test.

5. The method set forth in claim 1 wherein determining the test includes seeking an indication as to the time ordered nature of the data set.

6. The method set forth in claim 5 including generating a confirmatory notification of process stability.

7. The method set forth in claim 1 wherein determining the test includes seeking an indication of the nature of data as being attribute data or continuous data and, if the indication is that the data are attribute data, then seeking an indication as to the number of samples from which the data are drawn.

8. The method set forth in claim 7 wherein determining the test includes seeking an indication of sample size.

9. The method set forth in claim 8 wherein determining the test includes seeking an indication of normality of the data.

10. The method set forth in claim 7 wherein, if the indication is that the data are continuous, then seeking an indication as to the number of samples from which the data are drawn, an indication of sample size and an indication as to whether the data are normal, not normal, or if the distribution is unknown.

11. The method set forth in claim 10 wherein, if the indication is that the data are one of not normal or unknown, then providing confirmatory notifications either to use a normality test to determine normality, to use non-parametric tests or to use data transformation functions.

12. The method set forth in claim 1 wherein determining the test includes identifying a statistical parameter of interest.

13. The method set forth in claim 1 wherein the null and alternative hypothesis statements are defined based on the selected test and assumed conventions relating to the selected test and the indications of the test criteria and population description, and including providing a confirmatory notice of the null and alternative hypothesis statements in terms of the indications of the test criteria and population description.

14. A non-transitory computer readable medium accessible by a computer processor including a software program for automatically applying hypothesis testing to at least one data set, the software including modules for:
   A. selecting a plurality of statistical tests applicable to the at least one data set having a variety of characteristics;
   B. establishing conventions associated with each test of the plurality of tests;
   C. determining the test including seeking indications as to at least one characteristic of the data set, generating at least one confirmatory notification in response to the indications, and selecting a test from among the plurality of tests based on the indications and established conventions, and providing a confirmatory notification of the nature of the selected test, the indications and established conventions;
   D. characterizing the data set, including establishing test criteria, selecting an appropriate reference test value depending on the test selected; and eliciting an indication of a description of the data of interest;
   E. constructing null and alternative hypothesis statements;
   F. selecting a significance level,
   G. conducting the selected test including calculating the values of the test statistic, reference values, confidence bounds and p-values, comparing the calculated p-value to the indicated significance level and the value of the test statistic to one or more reference values, and assessing the confidence bounds in view of the null hypothesis statement;
   H. stating a conclusion in terms of the selected test, indicated test criteria and data descriptions whether to reject the null hypothesis or not to reject the null hypothesis and stating the basis for the conclusion using the results of the conducting step.

15. The computer readable medium of claim 14 wherein the modules state the null and alternative hypothesis statements in mathematical terms.

16. The computer readable medium of claim 15 wherein the modules establish the convention of stating the null as an equality and the alternative hypothesis statement as an inequality.

17. The computer readable medium of claim 14 wherein the plurality of tests include at least one of one proportion Z-test, one proportion binomial test, two proportion Z-test, multi proportion Chi-square test, one mean Z-test, one mean t-test, two means Z-test, two sample t-test; F-test Anova, Chi square test, F-ratio test, One Sample Sign Test, Paired Samples Sign Test, One Sample Wilcoxon Signed Ranks Test, Paired Samples Wilcoxon Signed Ranks Test, Mann Whitney Wilcoxon Test, Kruskal Wallis Test, and The Friedman Test.

18. The computer readable medium of claim 14 wherein determining the test includes seeking an indication as to the time ordered nature of the data set.

19. The computer readable medium of claim 18 wherein the modules generate a confirmatory notification of process stability.

20. The computer readable medium of claim 14 wherein determining the test includes seeking an indication of the nature of data as being attribute data or continuous data and, if the indication is that the data are attribute data, then seeking an indication as to the number of samples from which the data are drawn.

21. The computer readable medium of claim 20 wherein determining the test includes seeking an indication of sample size.

22. The computer readable medium of claim 21 wherein determining the test includes seeking an indication of normality of the data.

23. The computer readable medium of claim 20 wherein, if the indication is that the data are continuous, then seeking an indication as to the number of samples from which the data are drawn, an indication of sample size and an indication as to whether the data are normal, not normal, or if the distribution is unknown.

24. The computer readable medium of claim 23 wherein, if the indication is that the data are one of not normal or unknown, then providing confirmatory notifications either to use a normality test to determine normality, to use non-parametric tests or to use data transformation functions.

25. The computer readable medium of claim 14 wherein determining the test includes identifying a statistical parameter of interest.

26. The computer readable medium of claim 14 wherein the null and alternative hypothesis statements are defined based on the selected test and assumed conventions relating to the selected test and the indications of the test criteria and population description, and including providing a confirmatory notice of the null and alternative hypothesis statements in terms of the indications of the test criteria and population description.

27. A method for conducting a hypothesis test on at least one data set, the method comprising using a computer to carry out the steps of:
   A. selecting a plurality of statistical tests applicable to the at least one data set, each test of the plurality of tests having a variety of characteristics and establishing conventions associated with each test of the plurality of tests;
B. selecting the appropriate test including seeking indications regarding characteristics of the data set and the tests among the plurality of statistical tests;
C. establishing test criteria, selecting an appropriate reference test value depending on the test selected; and eliciting an indication of a description of the data of interest;
D. constructing null and alternative hypothesis statements in mathematical terms, including defining the null hypothesis based on the selected test and assumed conventions relating to the selected test and the indications of the test criteria and population description, providing a confirmatory notification of the null hypothesis statement;
E. seeking an indication of a significance level;
F. conducting the selected test; and
G. stating a conclusion, including calculating the values of the test statistic, calculating cut-off values, confidential intervals, and calculating p-values; comparing the calculated p-value to the indicated significance level, comparing the value of the test statistic to one or more of the reference values, the cut-off values or confidence intervals in view of the null hypothesis statement; and stating a conclusion in terms of the selected test, indicated test criteria and population descriptions whether to reject the null hypothesis or not to reject the null hypothesis based on the comparing step, and stating the basis for the conclusion using the results of the comparing step and the population descriptions.

28. The method set forth in claim 27 and including defining a statement for the alternative hypothesis based on the selected test and assumed conventions relating to the selected test and indications of the test criteria and population description, providing a confirmatory notification of the alternative hypothesis statement.

29. The method set forth in claim 28 wherein establishing conventions includes stating the null as an equality and the alternative hypothesis statement as an inequality.

30. The method set forth in claim 27 wherein the plurality of tests includes at least one of: one proportion Z-test, one proportion binomial test, two proportion Z-test, multi proportion Chi-square test, one mean Z-test, one mean t-test, two means Z-test, two sample t-test; F-test Anova, Chi square test, F-ratio test, One Sample Sign Test, Paired Samples Sign Test, One Sample Wilcoxon Signed Ranks Test, Paired Samples Wilcoxon Signed Ranks Test, Mann Whitney Wilcoxon Test, Kruskal Wallis Test, and The Friedman Test.

31. The method set forth in claim 27 wherein selecting the test includes seeking an indication as to the time ordered nature of the data set.

32. The method set forth in claim 27 wherein selecting the test includes generating a confirmatory notification of process stability.

33. The method set forth in claim 27 wherein selecting the test includes seeking an indication of the nature of data as being attribute data or continuous data.

34. The method set forth in claim 33 wherein selecting the test includes, if the indication is that the data are attribute data, seeking an indication as to the number of samples from which the data are drawn.

35. The method set forth in claim 33 wherein selecting the test includes seeking an indication of sample size.

36. The method set forth in claim 35 wherein selecting the test includes seeking an indication of normality of the data.

37. The method set forth in claim 27 wherein selecting the test includes, if the indication is that the data is continuous, seeking an indication as to the number of samples from which the data are drawn.

38. The method set forth in claim 27 wherein selecting the test includes seeking an indication of sample size.

39. The method set forth in claim 27 wherein selecting the test includes seeking an indication as to whether the data are normal, not normal, or if normalcy is unknown.

40. The method set forth in claim 27 wherein selecting the test includes, if the indication is that the data is one of not normal or unknown, then prompting confirmatory notifications either to use a normality test to determine normality, to use non-parametric tests or to use data transformation functions.

41. The method set forth in claim 27 wherein selecting the test includes identifying a statistical parameter of interest.

42. The method set forth in claim 40 wherein selecting the test includes selecting the parameter of interest from among the proportion, mean, and variance of the data.

43. The method set forth in claim 27 wherein selecting the test includes seeking an indication of samples from which the data are drawn and seeking an indication of whether, depending on the number of samples indicated, the data sample includes either paired data or differences between paired data samples.

44. The method set forth in claim 43 wherein selecting the test includes, if the parameter of interest is indicated as being the mean, seeking an indication of whether variance of population is known.

45. The method set forth in claim 27 wherein selecting the test includes selecting a test from among the plurality of tests based on elicited indications and established conventions, and providing a confirmatory notification of the nature of the selected test, the indications and established conventions.

* * * * *

UNITED STATES PATENT AND TRADEMARK OFFICE
CERTIFICATE OF CORRECTION

PATENT NO.        : 8,046,190 B2  
APPLICATION NO.   : 12/785223  
DATED             : October 25, 2011  
INVENTOR(S)       : Hathway Page 1 of 2

It is certified that error appears in the above-identified patent and that said Letters Patent is hereby corrected as shown below:

In the Drawings

Figure 10:
FIG. 10 illustrates a user interface generated by the software.
Figure 11:
FIG. 11 illustrates a user interface generated by the software.
Figure 13:
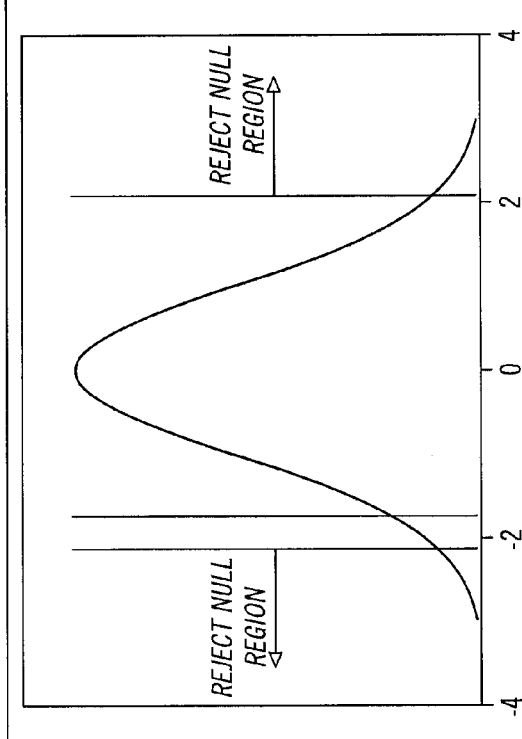
FIG. 13 illustrates a user interface generated by the software.

Fig. 10 should be replaced with the corrected Fig. 10 as shown on the attached page.

Signed and Sealed this
Fourteenth Day of October, 2014

Michelle K. Lee
*Deputy Director of the United States Patent and Trademark Office*

MORESTEAM.COM HYPOTHESIS TESTING WIZARD

STEP 3 OF 6 - STATE THE NULL AND ALTERNATIVE HYPOTHESES

YOUR NULL HYPOTHESIS MUST BE A STATEMENT THAT REFLECTS THE HISTORICAL BELIEF OF STATUS QUO CONDITION FOR THE TREATMENT OR METHOD UNDER STUDY. THEN, BASED ON THE RESULTS OF THE HYPOTHESIS TEST, YOU WILL EITHER RETAIN THIS BELIEF OR REJECT IT IN FAVOR OF THE ALTERNATIVE, WITH A CERTAIN LEVEL OF RISK (THE SPECIFIED SIGNIFICANCE LEVEL) ASSOCIATED WITH THE DECISION.

TEST: ONE MEAN t-TEST (PAIRED SAMPLES)

SELECT THE INEQUALITY FOR THE ALTERNATIVE HYPOTHESIS

● NOT EQUAL TO  ○ GREATER THAN  ○ LESS THAN

THINK OF THE HYPOTHESIS TESTING PROCESS AS A CRIMINAL TRIAL. UNDER THE U.S. PENAL CODE, THE DEFENDANT (THE PERSON UNDER TRIAL) IS PRESUMED INNOCENT UNTIL PROVEN GUILTY. SIMILARLY, THE NULL HYPOTHESIS (DEFENDANT) IS NOT REJECTED (PRESUMED INNOCENT) UNTIL THERE IS SUFFICIENT EVIDENCE TO REJECT IT (FOUND GUILTY), IN WHICH CASE THE ALTERNATIVE HYPOTHESIS IS ACCEPTED. IF THE NULL HYPOTHESIS IS NOT REJECTED, IT IS THE SAME AS ACQUITTING THE DEFENDANT FOR LACK OF EVIDENCE AGAINST THEM.

THE NULL HYPOTHESIS IS ALWAYS A COMPLEMENT OF THE ALTERNATIVE HYPOTHESIS. THUS, THE NULL MAY BE WRITTEN AS $=$, $\leq$ OR $\geq$ CORRESPONDING TO THE RESPECTIVE ALTERNATIVE HYPOTHESIS ($\neq$, $>$ OR $<$).

NOTE: THIS WIZARD WILL FOLLOW THE CONVENTION OF STATING THE NULL HYPOTHESIS AS A STATEMENT OF EQUALITY. FOR MORE INFORMATION, PLEASE CLICK THE HELP BUTTON.

NULL HYPOTHESIS: THE MEAN OF THE POPULATION OF DIFFERENCES (D=APPLES-ORANGES) IS EQUAL TO 0.03.

ALTERNATIVE HYPOTHESIS: THE MEAN OF THE POPULATION OF DIFFERENCES (D=APPLES-ORANGES) IS NOT EQUAL TO 0.03.

[EXIT]  [HELP]  [RESET]  [<<BACK]  [NEXT>>]  [FINISH]

*FIG. 10*

UNITED STATES PATENT AND TRADEMARK OFFICE
CERTIFICATE OF CORRECTION

| | | |
|---|---|---|
| PATENT NO. | : 8,046,190 B2 | |
| APPLICATION NO. | : 12/785223 | |
| DATED | : October 25, 2011 | |
| INVENTOR(S) | : Hathaway | |

It is certified that error appears in the above-identified patent and that said Letters Patent is hereby corrected as shown below:

In the Drawings

Fig. 10 should be replaced with the corrected Fig. 10 as shown on the attached page.

This certificate supersedes the Certificate of Correction issued October 14, 2014.

Signed and Sealed this
Eleventh Day of November, 2014

Michelle K. Lee
*Deputy Director of the United States Patent and Trademark Office*

MORESTEAM.COM HYPOTHESIS TESTING WIZARD

STEP 3 OF 6 - STATE THE NULL AND ALTERNATIVE HYPOTHESES

YOUR NULL HYPOTHESIS MUST BE A STATEMENT THAT REFLECTS THE HISTORICAL BELIEF OR STATUS QUO CONDITION FOR THE TREATMENT OR METHOD UNDER STUDY. THEN, BASED ON THE RESULTS OF THE HYPOTHESIS TEST, YOU WILL EITHER RETAIN THIS BELIEF OR REJECT IT IN FAVOR OF THE ALTERNATIVE, WITH A CERTAIN LEVEL OF RISK (THE SPECIFIED SIGNIFICANCE LEVEL) ASSOCIATED WITH THE DECISION.

TEST: ONE MEAN t-TEST (PAIRED SAMPLES)

SELECT THE INEQUALITY FOR THE ALTERNATIVE HYPOTHESIS

◉ NOT EQUAL TO   ○ GREATER THAN   ○ LESS THAN

THINK OF THE HYPOTHESIS TESTING PROCESS AS A CRIMINAL TRIAL. UNDER THE U.S. PENAL CODE, THE DEFENDANT (THE PERSON UNDER TRIAL) IS PRESUMED INNOCENT UNTIL PROVEN GUILTY. SIMILARLY, THE NULL HYPOTHESIS (DEFENDANT) IS NOT REJECTED (PRESUMED INNOCENT) UNTIL THERE IS SUFFICIENT EVIDENCE TO REJECT IT (FOUND GUILTY), IN WHICH CASE THE ALTERNATIVE HYPOTHESIS IS ACCEPTED. IF THE NULL HYPOTHESIS IS NOT REJECTED IT IS THE SAME AS ACQUITTING THE DEFENDANT FOR LACK OF EVIDENCE AGAINST THEM.

THE NULL HYPOTHESIS IS ALWAYS A COMPLEMENT OF THE ALTERNATIVE HYPOTHESIS. THUS, THE NULL MAY BE WRITTEN AS =, ≤ OR ≥ CORRESPONDING TO THE RESPECTIVE ALTERNATIVE HYPOTHESIS (≠, > OR <).

NOTE: THIS WIZARD WILL FOLLOW THE CONVENTION OF STATING THE NULL HYPOTHESIS AS A STATEMENT OF EQUALITY. FOR MORE INFORMATION, PLEASE CLICK THE HELP BUTTON.

NULL HYPOTHESIS: THE MEAN OF THE POPULATION OF DIFFERENCES (D=APPLES-ORANGES) IS EQUAL TO 0.03.

ALTERNATIVE HYPOTHESIS: THE MEAN OF THE POPULATION OF DIFFERENCES (D=APPLES-ORANGES) IS NOT EQUAL TO 0.03.

[EXIT]   [HELP]   [RESET]   [<<BACK]   [NEXT>>]   [FINISH]

*FIG. 10*